_United States Patent Office_

3,442,934
Patented May 6, 1969

3,442,934
PROCESS FOR PRODUCING ESTERS OF
ACRYLIC ACIDS
Lloyd A. Pine, Baton Rouge, La., assignor to Esso Research and Engineering Company, a corporation of Delaware
No Drawing. Filed Dec. 20, 1965, Ser. No. 515,191
Int. Cl. C07c 67/00
U.S. Cl. 260—486                                         11 Claims

ABSTRACT OF THE DISCLOSURE

Vapor phase condensation of acrylic acid and $C_1$–$C_{10}$ alpha-substituted alkyl acrylic acids with an organic alcohol in the presence of a molybdenum-containing catalyst increases the selectivity to the desired acrylate esters.

---

This invention is directed to an improved process for directly preparing organic esters of acrylic acid and $C_1$ to $C_{10}$ alkyl alpha ($\alpha$)-substituted acrylic acids.

More specifically, the present invention is directed to the direct production of organic esters of acrylic acid and alkyl $\alpha$-substituted acrylic acids in excellent selectivity and good conversions by the vapor phase contact of an organic alcohol with acrylic acid or an $\alpha$-substituted alkyl acrylic acid in the presence of a molybdenum catalyst containing a catalytic amount of a molybdenum material as the sole essential active catalyst material. The term "material" is used herein to indicate that the active molybdenum catalyst is frequently a mixture of molybdenum compounds, e.g., oxides, sulfides, etc., rather than a single pure compound. Of course, pure compounds can be used and the term "material" includes such pure compounds.

Recently there has been an increased demand for the production of acrylate and alkyl substituted acrylate esters, e.g., for use as monomers to produce a wide variety of polymeric materials for manufacture of plastics, coatings, etc. These esters are produced by esterification of said acids with alcohols. Such esterification reactions are expensive not only due to the comparatively high cost of the acrylic acid or $\alpha$-substituted alkyl acrylic acid, but also due to the comparatively poor selectivity at high conversions of acrylic and $\alpha$-substituted acrylic acids to the desired acrylate esters.

Recently there has been proposed a direct catalytic esterification process for forming organic esters in general by reacting organic acids with organic alcohols in the presence of molybdenum catalyst. This procedure is indicated in greater detail in United States Patent 3,329,826, filed by the present inventor and others on July 26, 1963. The above-indicated recent advance in the esterification art considers liquid phase esterification reactions to be preferred.

In contrast therewith the present invention is based upon the discovery that vapor phase condensation of acrylic acid and $\alpha$-substituted alkyl acrylic acids greatly enhances the selectivity with which the said acids are converted to their corresponding organic esters while maintaining good to superior conversions. When liquid phase esterification of acrylic and $\alpha$-substituted alkyl acrylic acids is conducted in the presence of the same molybdenum catalyst, the conversions are good, viz, essentially the same as with vapor phase condensation reaction, but the selectivity is significantly reduced.

One of the vexatious problems connected with the direct esterification reaction in the case of organic esters of acrylic and $\alpha$-substituted lower alkyl acrylic acids is that the selectivity to desired acrylate ester is hindered due to the production of alkoxy substituted saturated esters as a byproduct. The presence of the byproduct alkoxy ester in even small amounts, viz, from 5 to 10% and even greater, detracts significantly from the economic value of the good acid conversions secured by the use of the molybdenum-containing catalyst material. This is the case not only because of the increased cost involved in separating the byproduct alkoxy-substituted ester, but also due to the loss of the comparatively high priced acrylic acid to undesirable alkoxy ester byproduct. Consequently, the present invention offers a significant advance in the art by raising the selectivity of the direct condensation and esterification reaction to allow essentially quantitative selectivities within rapid contact times (at reasonably rapid throughput rates) and good to excellent conversions of the more expensive acrylic acid or alpha-substituted alkyl acrylic acid reactant directly to the desired ester product. These and other advantages will be apparent from the discussion which follows.

The discovery that vapor phase contact of the acrylic and alpha substituted alkyl acrylic acid with the organic alcohol in the presence of a molybdenum catalyst in a direct condensation-type esterification should lead to enhanced selectivities in production of desired acrylate esters is quite surprising because liquid phase condensation reaction and liquid phase contact is preferred for saturated organic acid esterification reactions as indicated in Ser. No. 297,946. The reason for this desirable increase in selectivity by employment of vapor phase direct esterification in the case of acrylic and alpha-substituted alkyl acrylic acids is not completely known. However, the data accumulated indicate that the vapor phase operations hinder the addition of the alcohol across the double bond of the acrylate esters and therefore reduce the formation of the alkoxy byproduct material which is, as explained hereinabove, undesirable.

The benefits of the present invention are obtainable using acrylic acid or in general any $\alpha$-substituted alkyl derivative of acrylic acid. These acids can be visualized as having the representative formula:

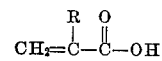

where R is selected from the group consisting of hydrogen and alkyl groups. Usually the alkyl substituent located on the $\alpha$-carbon atom of the acrylic acid contains from 1 to 10 carbon atoms, more usually from 1 to 5 carbon atoms and preferably from 1 to 3 carbon atoms. Suitable exemplary unsaturated acrylic and alpha substituted acrylic acids which can be employed in accordance with this invention include, but are not limited to, the following: acrylic acid, methyl acrylic acid, ethyl acrylic acid, propyl acrylic acid, n-butyl acrylic acid, iso-butyl acrylic acid, n-amyl acrylic acid, n-hexyl acrylic acid, n-heptyl acrylic acid, n-heptyl acrylic acid, n-octyl acrylic acid, n-nonyl acrylic acid, n-decyl acrylic acid, etc.

In general, any organic alcohol can be reacted with the above acrylic acid or $\alpha$-substituted acrylic acid to produce selectively and directly the acrylates and $\alpha$-substituted acrylate esters in increased selectivity and good to excellent conversions in accordance with this invention. Thus, suitable alcohols include the primary, secondary, and tertiary aliphatic, aromatic, and heterocyclic mono- and polyhydroxy alcohols. While secondary and tertiary alcohols are suitable for use in accordance with the present invention, it is preferable to employ primary alcohols because they exhibit less tendency to dehydrate to olefins than when secondary and tertiary alcohols are employed. Such organic alcohols usually contain from 1 to about 30 carbon atoms, and more preferably contain from about 1 to 10 carbon atoms. Suitable examples of organic alcohols which can be employed in accordance with the practice of this invention include, but are not limited to, the following: methyl alcohol, ethyl alcohol, the linear and branched propyl-, butyl-, amyl-, hexyl-, heptyl-, octyl-, nonyl-, decyl-, dodecyl-, cetyl-, carnaubyl-alcohols and the like. While dihydroxy aliphatic alcohols, including the glycols and pinacols, can be employed; the preferred esters produced in accordance with this invention are prepared from monohydroxy alcohols. Cyclic alcohols such as cyclopentanol, cyclohexanol, cycloheptanol, cyclooctanol, etc., can, of course, be employed.

The unsaturated acrylic or alpha substituted alkyl acrylic acid and organic alcohol reactants are contacted in the vapor phase in the presence of the molybdenum catalyst. Temperatures are employed which are high enough to ensure vapor phase reaction at the pressures employed, but at the same time avoid the thermal decomposition of the acid, alcohol, and especially the product ester being prepared. Generally temperatures below 700° F. are employed so long as the temperature is high enough at the pressure conditions used to ensure vapor phase operation. Usually the contact temperature in the presence of the molybdenum containing catalyst ranges anywhere from the boiling point of the least volatile component in the reaction mixture to approximately 25° F. or more below and more preferably 50° F. or more below the decomposition temperature of the product ester or the unsaturated acid, whichever is the less stable. The pressures employed can be varied widely as long as vapor phase operation is ensured. Usually, however, reaction pressures are below 100 p.s.i.g., e.g., from about 15 to about 60 p.s.i.g. Of course, the specific temperature and pressure conditions employed are varied depending upon the specific unsaturated acrylic acid and organic alcohol being reacted as well as the organic ester being produced.

The mole ratio of reactants (alcohol to acid) can be varied widely within the purview of this invention. Thus, the mole ratio of the alcohol to the acid can range from 0.1 to 8:1. Usually, however, it is desirable to employ from 0.5 to 5 mols of organic alcohol per mole of acrylic or alpha-alkyl substituted acrylic acid.

The catalyst employed to secure the direct condensation esterification in accordance with the present invention are molybdenum catalyst containing a catalytic amount of molybdenum compounds as the sole essential active catalyst materials. Suitable exemplary molybdenum catalysts include, but are not limited to, the following: molybdenum sulfides, molybdenum oxides, and sulfided cobalt molybdates, molybdenum blue ($MoO_3$), etc. These molybdenum active catalyst and the preparation thereof are disclosed in greater detail in U.S. Patent 3,329,826 and the disclosure of said patent is incorporated herein by reference.

The catalyst used in the present invention can be supported on inert carriers of any of the readily available types. Suitable exemplary carrier materials which can be employed as support components for the molybdenum catalyst in accordance with the present invention are the various aluminous and ciliceous materials of natural or synthetic origin such as: Bauxite, aluminum oxide, activated alumina, kieselguhr, magnesium oxide, magnesium silicate, barium sulfate, pumice, koalin, activated carbon, clays, Carborundum, Alundum, etc. The nonacidic or weakly acidic carriers are preferred so as to minimize acid catalyzed alcohol dehydration. Usually, the composite (supported) catalyst contains from 1 to 40 wt. percent of the active molybdenum compounds as the sole essential active esterification catalyst thereon, the remainder being a carrier support of the type above described, e.g., activated carbon. Preferably, however, the molybdenum-containing catalyst contains from about 2 to 25 wt. percent of the active molybdenum material supported on a activated carbon carrier.

While the contact times are related to the temperature and pressure conditions employed for each specific alcohol and acid reactant employed; usually the contact times range from 0.5 to 120 seconds and preferably from about 1.0 to 20 seconds. The exact contact times are not critical, however, as it is within the purview of this invention to recycle the unused reactant(s), e.g., the unreacted alcohol plus any unreacted acid, for repeated contacts in the vapor phase with the molybdenum containing catalyst.

The feed rates of the reactants over the catalyst can be varied widely. Thus, the feed rates of the reactants over the molybdenum containing catalyst can range from about 0.1 to 3.0 wt. parts of reactants per hour per wt. part of total catalyst (molybdenum containing active catalyst material plus inert support), referred to hereinafter as w./hr./w. Usually, the feed rates of the reactants range from about 0.2 to 1.0 w./hr./w. It is generally advisable to employ the alcohol reactant in excess in accordance with this invention as this tends to force the esterification reaction to completion using the less expensive reactant. However, the presence of large molar excesses of either reactant does not have any deleterious effects. The alkyl esters of the unsaturated acrylic and alpha-alkyl substituted acrylic acids produced in high selectivity and good conversions in accordance with this invention are suitable as monomers to produce polymers and copolymers for use as plastics or coatings.

While the amount of active molybdenum catalyst material utilized by the total reactants, i.e., acid plus alcohol supplied, can be varied widely, e.g., from 0.1 to 50 wt. percent; usually it is advisable to utilize from 0.2 to 30 wt. percent, and more preferably from 0.5 to 25 wt. percent, of the active molybdenum catalyst material based on the total reactants (acid plus alcohol). Of course, more than one molybdenum compound can be, and in fact usually is, present as the active molybdenum containing component of the catalyst, e.g., a mixture of two or more of the aforementioned molybdenum compounds.

The invention will be illustrated in great detail in the examples which follow. Of course, it should be clearly understood that the below examples are included to illustrate rather than limit the present invention.

Example 1.—Liquid phase vs. vapor phase esterification using the same reactants and molybdenum catalyst A comparative series of runs were made seeking to produce methyl acrylate by reaction of acrylic acid with methanol both in the liquid phase and in the vapor phase using a sulfided molybdenum on carbon catalyst containing 10 wt. percent of molybdenum sulfides. The acrylic acid and methanol were contacted in a tubular reactor in the presence of the above mentioned molybdenum catalyst with 3.5 moles of methanol being employed per mole of acrylic acid. The temperature, feed rate, and other conditions are tabulated hereinbelow in Table I which includes the conversion and selectivity data secured.

TABLE I.—FORMATION OF METHYLACRYLATE

[3.5 moles of alcohol per mole of acid]

|  | Liquid phase [1] | | | Vapor phase [2] | |
|---|---|---|---|---|---|
| Temperature, °F | 390 | 398 | 286 | 506 | 506 |
| Liquid feed rate, v./v./hr | 1.45 | 0.80 | 0.82 | 0.42 | 0.95 |
| Holding time, hours [3] | 0.69 | 1.25 | 1.22 | | |
| Contact time, seconds [4] | | | | 9.2 | 4.1 |
| Acid conversion, mol. percent | 92.2 | 98.2 | 79.2 | 95.4 | 59.6 |
| Selectivity to methyl acrylate, mol. percent | 75.2 | 85.8 | 33.4 | 95.1 | 92.5 |
| Selectivity to β-methoxy methyl propionate, mol. percent | 11.7 | 11.4 | 12.3 | 2.8 | 3.2 |
| Wt. percent bottoms in total product | 2.74 | 0.01 | 22.2 | 0.30 | 0.02 |

[1] 300 p.s.i.g.
[2] 1 atm.
[3] Holding time=1./v./v./hr. (liquid phase).
[4] Contact time (vapor phase) calculated from ideal gas laws.

As will be noted from the data in Table I, liquid phase operations using the same reactants and molybdenum catalyst yield comparatively considerable amounts of undesired byproducts, e.g., beta-alkoxy substituted esters probably due to the addition of the alcohol across the double bond of the acrylic ester. Furthermore, as noted from Table I, liquid phase esterification can lead to the formation of a considerable amount of heavy bottoms products. In this regard note especially the run at 286° F.

Thus it can be seen that conducting the esterification to produce acrylate and alpha-substituted alkyl acrylate esters in the vapor phase in the presence of molybdenum containing catalyst materials greatly enhances the selectivity to the desired acrylate esters and at the same time maintains the good to high conversions of the acid.

Example 2

A comparison of liquid versus vapor phase operations was made using ethanol as the organic alcohol feed. The catalyst and reactor were the same as used in Example 1. The feed was a blend of 3.5 moles of ethanol per mole of acrylic acid. Table II below summarizes the pertinent data.

TABLE II

| | Liquid phase | Vapor phase |
|---|---|---|
| Pressure, p.s.i.g | 400 | 0 |
| Temperature, °F | 400 | 500 |
| Liquid feed rate, v./v./hr | 0.80 | 0.39 |
| Holding time, hours | 1.25 | |
| Contact time, seconds | | 12.7 |
| Acid conversion, mol. percent | 96.3 | 89.7 |
| Selectivity to— | | |
| Ethyl acrylate, mol. percent | 81.4 | 89.4 |
| β-Ethoxy ethyl propionate, mol. percent | 7.9 | 1.8 |
| Wt. percent bottoms in total product | 3.8 | 0.04 |

While the present invention has been illustrated in detail in the foregoing examples; it should be understood clearly that these examples are included to illustrate the invention and should not be construed as limiting thereon. The invention is limited only by the claims set forth hereinafter.

What is claimed is:

1. A process for directly producing organic esters of acrylic and alpha-substituted alkyl acrylic acids which comprises contacting an acid of the representative formula:

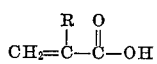

where R is selected from the group consisting of hydrogen and alkyl groups having from 1 to about 10 carbon atoms with 0.5 to 5 moles of an organic alcohol per mole of said acid, said alcohol having from 1 to about 30 carbon atoms, in the vapor phase at a temperature below the decomposition temperature of the least stable of the compounds present in the reaction zone in the presence of a molybdenum-containing catalyst containing a catalytic amount of a molybdenum material as the sole essential active catalyst material.

2. A process as in claim 1 wherein said vapor phase contact is at temperatures at least about 25° F. below said decomposition temperature.

3. A process as in claim 1 wherein said sole essential active catalyst is supported on an inert carrier and the concentration of said sole essential active catalyst material based upon the total of said sole essential active catalyst plus said carrier ranges from 2 to 25 wt. percent.

4. A process as in claim 1 wherein the concentration of said sole essential active catalyst material based upon total reactants ranges from about 0.5 to about 25 wt. percent.

5. A process as in claim 1 wherein said molybdenum material is a molybdenum sulfide.

6. A process as in claim 1 wherein said molybdenum material is a sulfided cobalt molybdate.

7. A process as in claim 3 wherein said inert carrier is activated carbon.

8. A process for directly producing organic esters of acrylic and alpha-substituted alkyl acrylic acids which comprises contacting an acid of the formula:

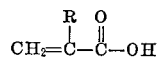

where R is selected from the group consisting of hydrogen and alkyl groups having from 1 to 5 carbon atoms with 0.5 to 5 moles of an organic alkyl alcohol per mole of said acid, said alcohol containing from 1 to 30 carbon atoms, in the vapor phase at temperatures at least about 25° F. below the decomposition temperature of the least stable compound present in the reaction zone in the presence of a molybdenum-containing catalyst containing a catalytic amount of the molybdenum material as the sole essential active catalyst material, said molybdenum material being selected from the group consisting of molybdenum sulfide and sulfided cobalt molybdate.

9. A process as in claim 8 wherein said sole essential active catalyst is supported on an inert carrier and the concentration of said sole essential active catalyst material based upon the total of said sole essential active catalyst plus said carrier ranges from 2 to about 25 wt. percent.

10. A process as in claim 8 wherein the concentration of said sole essential active catalyst material based upon total reactants ranges from about 0.5 to about 25 wt. percent.

11. A process according to claim 8 wherein R is hydrogen or an alkyl group having from 1 to 3 carbon atoms and wherein the alcohol is a monohydroxy alcohol having from 1 to about 10 carbon atoms.

References Cited

UNITED STATES PATENTS

| 1,819,818 | 8/1931 | Jaeger | 260—476 |
| 2,457,225 | 12/1948 | Gresham | 260—486 |
| 3,329,826 | 7/1967 | Pine et al. | 260—410.6 |

OTHER REFERENCES

Andrianova et al.: Chemical Abstracts, vol. 55: 15,075 (1961).

LORRAINE A. WEINBERGER, *Primary Examiner.*

ALBERT P. HALLUIN, *Assistant Examiner.*